W. H. HUTCHINSON.
EGG DETECTOR.
APPLICATION FILED SEPT. 6, 1910.
995,144.
Patented June 13, 1911.
2 SHEETS—SHEET 1.
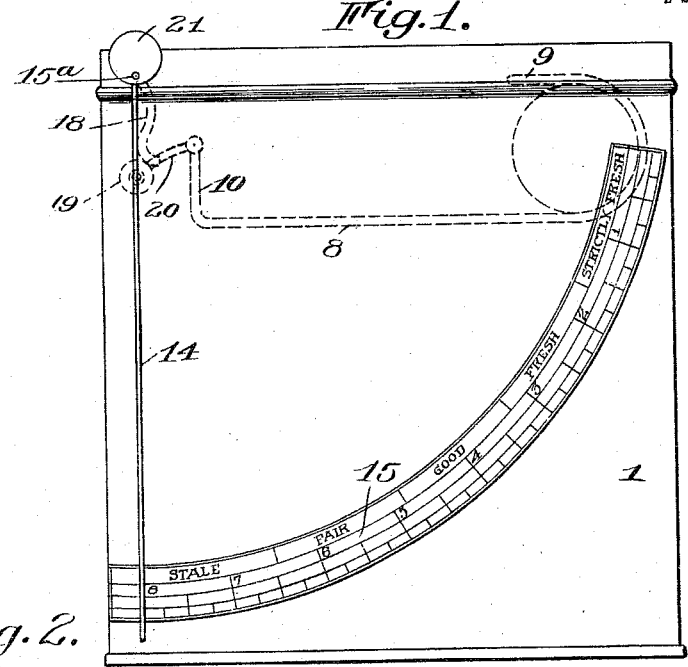
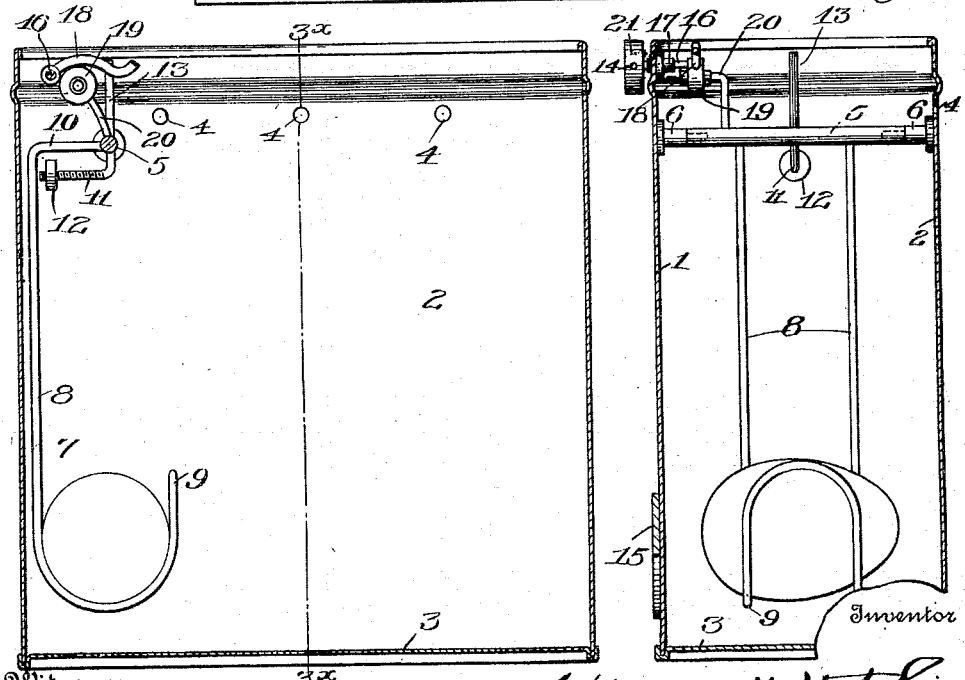

W. H. HUTCHINSON.
EGG DETECTOR.
APPLICATION FILED SEPT. 6, 1910.
995,144.
Patented June 13, 1911.
2 SHEETS—SHEET 2.
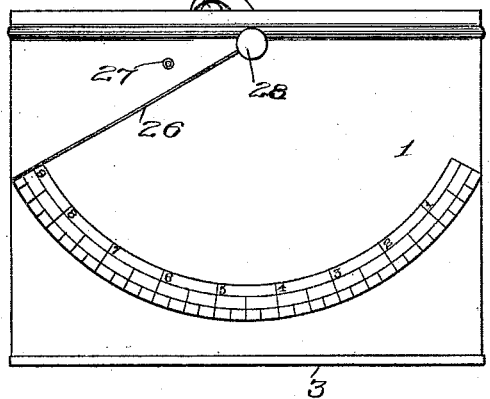
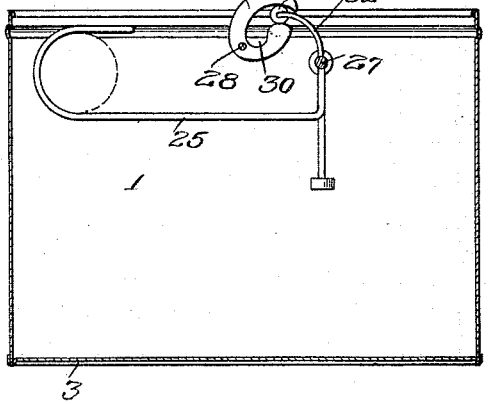
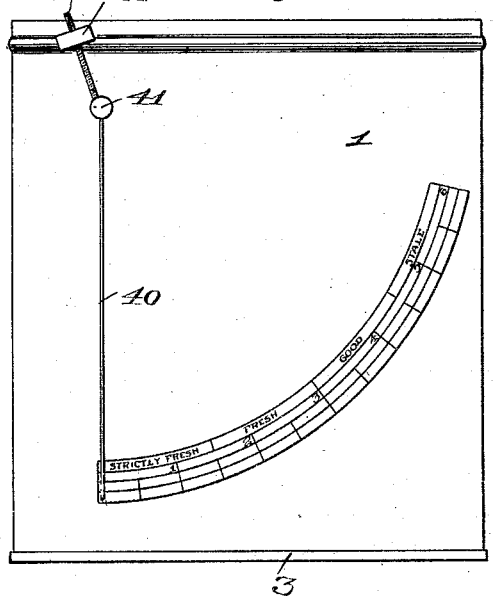
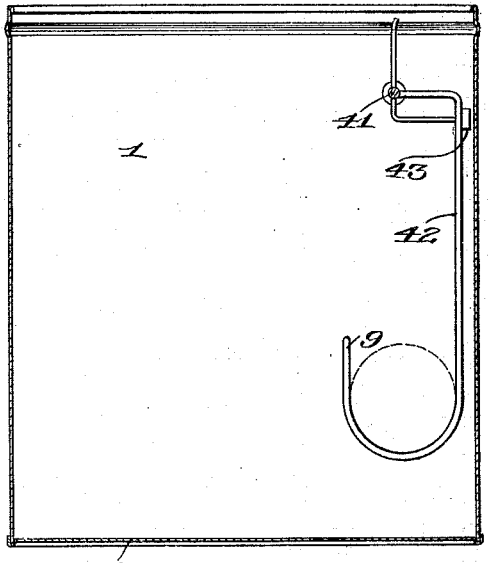
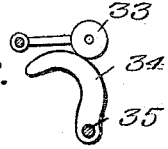
Witnesses
Walter B. Payne
Inventor
William H. Hutchinson
By his Attorneys

UNITED STATES PATENT OFFICE.

WILLIAM H. HUTCHINSON, OF ROCHESTER, NEW YORK.

EGG-DETECTOR.

995,144.

Specification of Letters Patent.  Patented June 13, 1911.

Application filed September 6, 1910. Serial No. 580,616.

*To all whom it may concern:*

Be it known that I, WILLIAM H. HUTCHINSON, of Rochester, in the county of Monroe and State of New York, have invented certain new and useful Improvements in Egg-Detectors; and I do hereby declare the following to be a full, clear, and exact description of the same, reference being had to the accompanying drawings, forming a part of the specification, and to the reference-numerals marked thereon.

My present invention has for its object to provide an instrument for detecting the quality of eggs and determining their adaptability for various purposes, such as use in incubators, or with sitting hens and for household use.

A further object of my invention is to provide a device which is simple in construction and will enable the operator to grade a quantity of eggs obtained from different sources and at different times, according to the degree of freshness which the eggs when tested separately may show. To this end I have provided means for readily determining the specific gravity of an egg and indicating its age and quality.

To these and other ends the invention consists in certain improvements and combinations of parts all as will be hereinafter more fully described, the novel features being pointed out in the claims at the end of the specification.

In the drawings: Figure 1 is a side elevation of an instrument showing one embodiment of my invention. Fig. 2 is a vertical sectional view thereof. Fig. 3 is a detail sectional view taken on the line $3^x$—$3^x$ of Fig. 2. Fig. 4 is a side elevation showing a modification. Fig. 5 is a vertical sectional view showing the means employed for operating the index finger. Figs. 6 and 7 are side elevations and cross sectional views, showing another type of the apparatus. Fig. 8 is a detail view showing a modified form of the cam operating mechanism employed for actuating the index finger.

An instrument constructed in accordance with my invention is adapted to determine the quality of an egg by means of the variations which occur in its specific gravity due to its age, but it will be understood, of course, that the deterioration which an egg undergoes depends largely upon the condition under which it is kept, although there will be a gradual diminution from day to day which will cause the egg in time to pass through the various grades known as strictly fresh, fresh, good, fair and stale. As an egg passes from one grade to another, its specific gravity changes and by means of a suitable apparatus such a fact may readily be determined.

In carrying out my invention, I employ a receptacle or tank preferably rectangular, comprising the front and rear walls 1 and 2, and bottom 3, the tank being of any desired size, and one of the walls, preferably the rear wall, being provided with apertures or perforations near its upper edge which will determine the height of the liquid, in which the egg is immersed. Arranged within the vessel is a pivoted holder comprising a revoluble shaft 5 supported at its ends in bearings 6 on the front and rear walls and carrying the arm 7 which is adapted to receive the egg. This arm is preferably made of a single piece of wire forming the parallel side pieces 8 which are attached at one end to the shaft 5 and at their opposite extremities are curved or bent, as indicated at 9, to form a saddle or holder in which the egg may be slipped and held by spring pressure, the egg being supported with its major axis standing in a direction parallel to the shaft 5. The side pieces 8 of the holder are offset from the shaft 5, as indicated at 10, so that when an egg is supported therein and immersed in the liquid to the lowest point to which it can be carried by the holder, any tendency which it may have to rise will be exerted at one side of the shaft and tend to cause the latter to be rotated, this being an important feature, as there is but slight buoyancy in eggs which are graded as fresh, as distinguished from those of a strictly fresh quality. The counterbalance is also connected to the shaft 5 which comprises a short rod 11 extending at one side of the pivotal center on which is supported an adjustable weight 12. It will be noticed that the shaft 5 is arranged at one end of the receptacle and slightly beneath the apertures 4, which determine the level of the liquid, so that when an exceptionally poor or stale egg is inserted in the holder, it will support the latter in the position shown in the dotted lines in Fig. 1, which is about the position the holder assumes when the egg is inserted therein. To facilitate this movement on the part of the operator, the shaft 5 is provided with a short finger 13 which projects above the surface of the liquid which may be depressed to tilt the holder upwardly into position to receive an egg. Eggs of different qualities possessing different specific gravities will sink different depths in the liquid and carry the holder downwardly from the position shown in Fig. 1 to that shown in Fig. 2 or some intermediate position, and from this adjustment of the holder which an egg will automatically produce, its quality may be determined.

Operating in conjunction with the carrier is an index finger 14 arranged exteriorly of the receptacle which coöperates with a scale 15 mounted on the wall of the receptacle and containing graduations, as shown, which have been established as correct by averages obtained from continued experiments with a large number of eggs of different commercial sizes extending over a considerable period of time, said eggs being also kept under different atmospheric conditions. The index finger is pivoted at a point indicated by 15ª and is supported upon an arbor 16 journaled in the sleeve 17 secured to the front wall of the receptacle. Extending laterally from the arbor is an arm 18 which rests upon a small roller 19 carried on a crank arm 20 rigidly connected to the shaft 5 of the egg holder. The parts just described form an operating connection between the holder and the index finger and are so arranged that the holder and index finger move relatively in the opposite direction, the arm 18 being curved, as shown particularly in Fig. 2, to form a cam surface which is so shaped as to give a practically uniform movement to the finger 14 without retarding the movement of the holder in any way. The arm 20 preferably supports the roller 19 to one side of the axis of the shaft 5 and the arm 18 bearing upon the roller when the holder is carried downwardly to its lowest position, at which time the index finger projects substantially in a horizontal direction over the scale graduation marked "Strictly fresh". From this arrangement of the parts it will be seen that the instrument is very sensitive in its operation, as the rotary movement of the holder is not in any way retarded by the index finger and as the latter is also provided with a counterbalance 21, the arm 18 bearing on the roller 19 will not exert an appreciable influence on the holder to alter its position.

In Figs. 4 and 5 I have shown a modification of the apparatus in which a different form of operating connection is provided between the egg holder 25 and the indicating finger 26. The former is pivoted on the shaft 27, while the latter is shown and determined at the point 28. The arbor carrying the index finger is provided with a plate 29 having a cam slot 30 in which is guided the roller 31 carried on the crank arm 32. In this arrangement of the parts the movement of the index finger in the direction opposite to the movement of the egg holder is also accomplished. In other words, when the egg holder is carried upwardly by a bad or stale egg in the position shown in Fig. 5, the index finger will be rotated to the position shown in Fig. 4, whereas, if the egg which is being tested is of the strictly fresh quality, the holder will be rotated downwardly and the finger moved to the opposite end of the scale. It will be understood, of course, that other arrangements of these parts may be made without departing from the spirit of my invention, for example, the roller may be connected to the index finger, as shown in Fig. 8, in which the roller is indicated by 33, the cam operating therewith, which is indicated by 34, being attached to the arbor 35 on which the egg holder is mounted.

In Figs. 6 and 7 I have shown another arrangement of parts in which the index finger 40 is rigidly connected to the shaft 41 on which the egg holder 42 is carried, the latter being counterbalanced by the weight 43 which is initially given an approximate adjustment, which fine adjustment as may be required to render the instrument sensitive being obtained by rotating the weight 44 on the screw threaded end of the arm 45 arranged exteriorly of the receptacle and projecting in an opposite direction from the index finger 40.

I claim as my invention:

1. In an egg detector, the combination with a liquid receptacle, of a pivoted holder located therein adapted to receive an egg, the position of said holder on its pivot being determined by the buoyancy of the egg, and an indicator arranged exteriorly of the receptacle and coöperating with the holder.

2. In an egg detector, the combination with a non-transparent receptacle adapted to contain a liquid provided with means for determining the position of the surface of the liquid in said receptacle, of a holder pivoted in the receptacle and adapted to receive an egg, the pivotal point of said holder being located relatively to the surface of the liquid, and an indicator arranged exteriorly of the receptacle and operated by the holder.

3. In an egg detector, the combination with a tank adapted to contain a predetermined quantity of liquid, a holder rotatably fixed on a horizontal pivot located near the surface of the liquid and adapted to receive an egg, an indicator operated by the holder and arranged exteriorly of the tank and a scale on the outer face of the wall of the tank coöperating with the indicator.

4. In an egg detector, the combination with a tank, a body of liquid therein and a holder pivoted in the tank comprising an arm adapted to receive an egg, said arm being offset from the pivot and adapted to support the egg with its major axis parallel to the pivot of said holder, of an indicator operated by the holder.

5. In an egg detector, the combination with a tank, a body of liquid therein and a horizontally rotatable shaft, of an egg holding arm attached to and offset from the shaft, a balance operating on the latter to counteract the weight of the arm and an indicating finger arranged exteriorly of the tank and operated by the rotary movement of the shaft.

6. In an egg detector, the combination with a vessel containing liquid and a holder pivotally supported on the walls of the vessel and adapted to receive an egg and support it with its major axis extending parallel to the axis of the holder, of an indicating finger operated by the holder and arranged outside of the vessel.

7. In an egg detector, the combination with a vessel containing liquid and having parallel front and rear walls and a shaft extending between said walls and pivotally supported thereon at its ends, of an egg holder supported on and offset from said shaft, a finger located exteriorly of the vessel and operated by the rotary movements imparted to the shaft and a scale arranged on the wall of the vessel and coöperating with the indicating finger.

8. In an egg detector, the combination with a vessel containing liquid, a pivoted holder adapted to receive an egg, of a movable indicating finger and a cam operating mechanism interposed between said holder and finger.

9. In an egg detector, the combination with a vessel containing liquid, a pivoted holder for receiving an egg, the position of which is determined by the buoyancy of the egg in the liquid, of a pivoted indicating finger and operating connections between the holder and finger for actuating the latter in a reverse direction to that of the holder.

10. In an egg detector, the combination with a vessel containing liquid and a holder pivotally supported on the walls of the vessel and adapted to receive an egg, of an indicating finger also pivoted on the vessel at one side of the pivot of the holder, a cam on one of said parts and a coöperating arm on the other, said cam and arm operating to actuate the finger relatively to the holder.

WILLIAM H. HUTCHINSON.

Witnesses:
  G. WILLARD RICH,
  RUSSELL B. GRIFFITH.

---

Copies of this patent may be obtained for five cents each, by addressing the "Commissioner of Patents, Washington, D. C."